3,107,231
STABILIZERS FOR POLYMERS CONTAINING CHLORINE

Hugo Malz and Ernst Roos, Leverkusen, and Wilhelm Göbel, Cologne-Flittard, Germany, assignors to Farbenfabriken Bayer Aktiengesellschaft, Leverkusen, Germany, a corporation of Germany
No Drawing. Filed Oct. 24, 1960, Ser. No. 64,296
Claims priority application Germany, Oct. 23, 1959
4 Claims. (Cl. 260—45.9)

Polymers containing chlorine, such as polymers of vinyl chloride and copolymers of vinyl chloride and vinyl acetate, as well as polymers and copolymers of vinylidene chloride and chlorination products of higher or polymeric hydrocarbons (such as chlorinated paraffin or chlorinated natural or synthetic rubber), experience undesired changes under the action of heat and light, primarily splitting off HCl. These changes lead to discoloration and a deterioration in the mechanical properties. It is consequently necessary to add stabilizers in order to improve the processing properties and the properties per se of chlorine-containing compounds of higher molecular weight.

Numerous substances from various different classes of materials have been proposed as stabilizers. Examples of such inorganic compounds are the oxides, hydroxides, carbonates, phosphates and phosphites of the alkali and alkaline earth metals and various heavy metals, such as zinc, cadmium or lead, and also other salts, such as organic and organometallic compounds.

A stabilizer should, as far as possible, be suitable for many types of the aforesaid groups of polymers and it should simultaneously stabilize them against heat and light, not render the processing of the material difficult and be compatible with additives, such as plasticizers. Moreover, its physiological properties are important. Many of the proposed compounds satisfy only some of these requirements.

Strictly organic stabilizers frequently have the advantage over inorganic and organometallic compounds of having better compatibilty with polymer and plasticizer, better stability with respect to hydrogen sulphide and impart better physiological and electrical properties to the finished product. On the other hand, their stabilizing action, more especially against light, is not equal to all requirements and frequently it is also only developed in combination with a second substance having a stabilizing action. For example, organic esters of phosphoric and phosphorous acid are primarily used in mixtures with metal soaps, such as barium-cadmium stearate.

It has now been found that monohydrazides and dihydrazides of phosphoric or thiophosphoric acid are excellent stabilizers for polymers which contain chloride. The compounds to be used according to the invention have the following general formulae

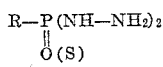

or

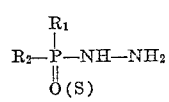

in which R, $R_1$ and $R_2$ each represent an organic radical connected by way of O, N or C atoms to the phosphorus atom. These organic radicals represent preferably aromatic or hydroaromatic groups such as phenyl or naphthyl radicals which can be substituted e.g. by halogen or alkyl groups whereby said alkyl groups can contain for example up to 18 carbon atoms, preferably up to 12 carbon atoms.

Such compounds are generally known from the literature and can easily be prepared, for example by reacting suitable phosphoric acid or thiophosphoric acid halides with hydrazine. Examples of these compounds are phosphoric acid or thiophosphoric acid-diester-monohydrazides, phosphoric acid or thio phosphoric acid-monoester-dihydrazides, amidophosphoric acid or amidothiophosphoric acid dihydrazides, amidophosphoric acid or amidothiophosphoric acid ester hydrazides or phosphoric acid dihydrazides. From the large number of compounds which are possible, the following are to be mentioned as examples without however limiting the scope of the invention in any way:

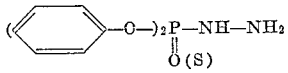

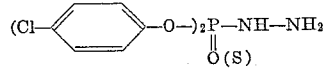

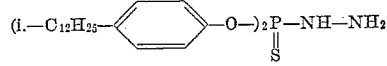

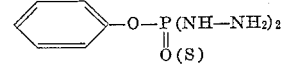

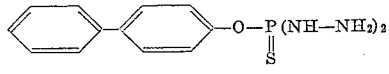

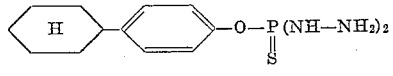

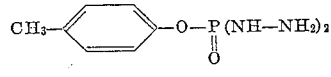

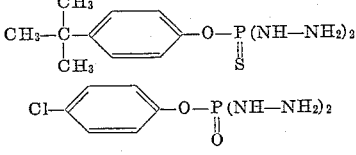

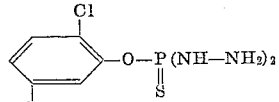

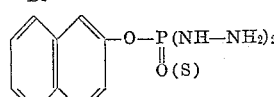

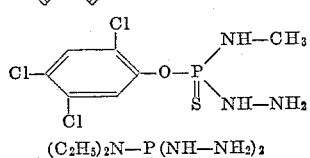

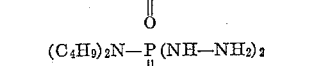

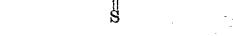

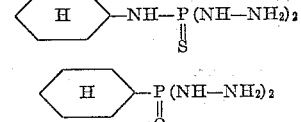

The stabilizers to be used according to the invention are crystalline or liquid, odorless compounds and have good compatibility with the polymers or copolymers containing chlorine and the plasticizers normally use, and produce good stabilization against heat and light. Furthermore, they are not toxic. They are used in the conventional manner by being added for example alone or in admixture with one another and/or admixed with other stabilizers in quantities of 0.1 to 5% by weight and advantageously 0.3 to 2% by weight, to the compounds of higher molecular weight containing chlorine. This addition can for example be made on the roller with polymers or copolymers, for example during the polymerization or during the subsequent preparation of a mixture.

Chlorine-containing polymers which are suitable for the process according to the invention are for example polymers of vinyl chloride or vinylidene chloride, 2-chlorobutadiene or copolymers of these compounds with vinyl acetate, chlorinated rubber, sulphochlorinated polyethylene and others.

The compounds used according to the invention satisfy the conditions which are required of a stabilizer for chlorine-containing polymers of higher molecular weight in a substantially better manner than the compounds so far known. For example, as compared with the salts or esters of phosphoric acid and phosphorous acid, they produce an excellent heat and light stabilization when used alone, and this stabilization can be even further improved by suitable combination with corresponding substances.

In addition, they have very good compatibility with the chlorine-containing polymers or copolymers and the plasticizers which are normally to be introduced.

EXAMPLE 1

100 parts by weight of a polyvinyl chloride with the K-value 70, prepared by emulsion polymerization, are in each case mixed on a roller heated to 160° C. with one of the substances indicated below.

After a rolling period of 10 minutes, samples are taken, each of which is illuminated for 24 hours and 100 hours with a xenon-high pressure lamp ("Xenotest" apparatus, Original Hanau).

Specimens of the sheets obtained after a rolling period of 25 minutes are stored at a temperature of 170° C. in a circulating hot air chamber. The table indicates the discoloration observed after the period indicated.

The following substances were added:

(a) 1 part by weight of 4-chlorophenyl-thiophosphoric acid dihydrazide
(b) 1 part by weight of phenyl thiophosphoric acid dihydrazide
(c) 1 part by weight of (diphenyl-4)-thiophosphoric acid dihydrazide
(d) 1 part by weight of (β-naphthyl)-thiophosphoric acid dihydrazide
(e) 1 part by weight of 4-(cyclohexyl)-phenyl-thiophosphoric acid dihydrazide
(f) No additive
(g) 1 part by weight of phenyl urea (for comparison purposes)
(h) 1 part by weight of aminocrotonic acid ester (for comparison purposes)
(i) 1 part by weight of dibasic lead phosphite (for comparison purposes)

The color tone of the specimens is indicated in the following tables by the following abbreviations:

(1) cl: colorless
(2) acl: almost colorless
(3) sys: slightly yellowish
(4) ys: yellowish
(5) y: yellow
(6) sbr: slightly brownish
(7) rbr: reddish brown
(8) br: brown
(9) dbr: dark brown
(10) bl: black

*Table 1*

| Compound | Color after rolling for 25 mins. at 160° C. | Color of the sheet rolled for 25 mins. in a heated chamber at 170° C. after— | | | | Color of the sheet rolled for 10 mins. after exposure to light for— | |
|---|---|---|---|---|---|---|---|
| | | 15 min. | 30 min. | 45 min. | 60 min. | 24 hours | 100 hours |
| (a) | cl | sys | sbr | dbr | -------- | cl | cl |
| (b) | cl | sys | sbr | br | -------- | cl | cl |
| (c) | cl | acl | sbr | br | bl | acl | sbr |
| (d) | cl | acl | sbr | br | dbr | br | br |
| (e) | cl | acl | sbr | br | dbr | cl | cl |
| (f) | rbr¹ | dbr | -------- | -------- | -------- | rbr | rbr |
| (g) | sys | y | br | dbr | -------- | -------- | -------- |
| (h) | y | y | y | dbr | -------- | -------- | -------- |
| (i) | br | br | y | dbr | -------- | -------- | -------- |

¹ After 5 minutes br.

EXAMPLE 2

The mixtures of substances indicated below are processed and tested as described in Example 1.

The following are added:

(a) 0.05 part by weight of (β-naphthyl)-thiophosphoric acid-dihydrazide, 0.5 part by weight of α-phenylindole
(b) 0.1 part by weight of (β-naphthyl)-thiophosphoric acid-dihydrazide, 0.5 part by weight of α-phenylindole
(c) 0.5 part by weight of 4-cyclohexyl-phenyl-thiophosphoric acid-hydrazide, 0.5 part by weight of α-phenylindole
(d) 1.0 part by weight of 4-cyclohexyl-phenyl-thiophosphoric acid-dihydrazide, 0.5 part by weight of α-phenylindole For comparison purposes, there was employed:

(e) 1.0 part by weight of α-phenylindole

*Table 2*

| Specimen | Color after rolling for 25 mins. at 160° C. | Color of the sheet, rolled for 25 mins. after being in a heated chamber at 170° C. for— | | | | |
|---|---|---|---|---|---|---|
| | | 15 min. | 30 min. | 45 min. | 60 min. | 90 min. |
| (a) | cl | acl | sys | sys | y | dbr |
| (b) | cl | acl | acl | sys | y | dbr |
| (c) | cl | acl | sys | ys | y | dbr |
| (d) | cl | acl | sys | ys | y | dbr |
| (e) | acl | sys | ys | y | sbr | dbr |

EXAMPLE 3

The substances set out below are mixed on a roller heated to 165° C. with 100 parts by weight in each case of a polyvinyl chloride with the K-value 70 prepared by suspension polymerization, the polyvinyl chloride being tested as described in Example 1.

There are added:

(a) 2 parts by weight of (diphenyl-4)-thiophosphoric acid-dihydrazide
(b) 2 parts by weight of (β-naphthyl)-thiophosphoric acid-dihydrazide
(c) 2 parts by weight of 4-cyclohexyl-phenyl-thiophosphoric acid-dihydrazide.

The following are added for comparison purposes:

(d) 2 parts by weight of α-phenylindole
(e) No addition
(f) 2 parts by weight of cadmium stearate

Table 3

| Specimen | Color after rolling for 25 mins. at 160° C. | Color of the rolled sheet after being in a heated chamber at 170° C. for— | | | | Color of the sheet rolled for 10 minutes after exposure to light for 24 hours |
|---|---|---|---|---|---|---|
| | | 15 min. | 30 min. | 45 min. | 60 min. | |
| (a) | acl | br | dbr | | | cl |
| (b) | cl | sbr | dbr | | | |
| (c) | cl | br | dbr | | | cl |
| (d) | ys | br | dbr | | | br |
| (e) | (¹) | | | | | |
| (f) | sbr | br | br | dbr | | |

¹ After 5 mins. br (adheres strongly to the roller).

EXAMPLE 4

100 parts by weight of a polyvinyl chloride with the K-value 70, prepared by suspension polymerization, and containing 0.62 part by weight of sodium acetate, are processed on a roller heated to 165° C. with the substances indicated below and tested, as described in Example 1.

The following are added:

(a) 1 part by weight of 4-chlorophenyl-thiophosphoric acid-dihydrazide
(b) 1 part by weight of phenyl-thiophosphoric acid-dihydrazide
(c) 1 part by weight of (diphenyl-4)-thiophosphoric acid-dihydrazide
(d) 1 part by weight of (β-naphthyl)-thiophosphoric acid-dihydrazide
(e) 1 part by weight of 4-cyclohexyl-phenyl-thiophosphoric acid-dihydrazide The following are added for comparison purposes:

(f) 1 part by weight of α-phenylindole
(g) 1 part by weight of N,N'-diphenyl thiourea
(h) No addition

Table 4

| Specimen | Color after 25 mins. rolling at 160° C. | Color of the rolled sheet after being in a heated chamber at 170° C for— | | | |
|---|---|---|---|---|---|
| | | 15 min. | 30 min. | 45 min. | 60 min. |
| (a) | cl | acl | br | dbr | |
| (b) | cl | sys | br | dbr | |
| (c) | cl | acl | sys | br | dbr |
| (d) | cl | acl | sys | br | dbr |
| (e) | cl | acl | ys | dbr | |
| (f) | ys | y | sbr | br | rbr |
| (g) | ys | br | dbr | | |
| (h) | rbr ¹ | | | | |

¹ After 10 minutes.

EXAMPLE 5

100 parts by weight of a polyvinyl chloride with the K-value 70, prepared by suspension polymerization, and containing 0.62 part by weight of sodium acetate, are in each case processed with one of the mixtures of substances indicated below on a roller heated to 165° C. and tested, as described in Example 3.

The following are added:

(a) 0.5 part by weight of (β-naphthyl)-thiophosphoric acid-dihydrazide, 0.5 part by weight of α-phenylindole
(b) 1.0 part by weight of (β-naphthyl)-thiophosphoric acid-dihydrazide, 1.0 part by weight of α-phenylindole
(c) 0.5 part by weight of 4-cyclohexyl-phenyl-thiophosphoric acid-dihydrazide, 0.5 part by weight of α-phenylindole
(d) 1.0 part by weight of 4-cyclohexyl-phenyl-thiophosphoric acid-dihydrazide, 1.0 part by weight of α-phenylindole
(e) 2.0 parts by weight of α-phenylindole
(f) No additive

Table 5

| Specimen | Color after rolling for 25 mins. at 160° C. | Color of the sheet, rolled for 25 mins. after heating to 170° C. for — | | | |
|---|---|---|---|---|---|
| | | 15 min. | 30 min. | 45 min. | 60 min. |
| (a) | cl | sys | ys | br | dbr |
| (b) | cl | acl | sys | y | dbr |
| (c) | cl | sys | y | rbr | dbr |
| (d) | cl | acl | sys | y | dbr |
| (e) | ys | sbr | br | br | dbr |
| (f) | br ¹ | | | | |

¹ After 10 minutes.

EXAMPLE 6

60 parts by weight of a polyvinyl chloride with the K-value 70 prepared by emulsion polymerization and 40 parts by weight of an alkyl sulphonic acid ester of phenol-cresol are rolled for 25 minutes at 160° C. with the substances indicated below and processed and tested as described in Example 1.

There are added:

(a) 0.3 part by weight of 4-cyclohexyl-phenyl-thiophosphoric acid-dihydrazide
(b) 0.6 part by weight of 4-cyclohexyl-phenyl-thiophosphoric acid-dihydrazide
(c) No addition

Table 6

| Specimen | Color after rolling for 25 mins. at 160° C. | Color of the sheet, rolled for 25 mins. after heating to 170° C. for — | | | | |
|---|---|---|---|---|---|---|
| | | 15 min. | 30 min. | 60 min. | 90 min. | 120 min. |
| (a) | cl | cl | cl | sys | br | dbr |
| (b) | cl | cl | cl | acl | br | dbr |
| (c) | sbr | sbr | br | | | |

EXAMPLE 7

60 parts by weight of a polyvinyl chloride with the K-value 70, prepared by emulsion polymerization, and 40 parts by weight of dioctyl phthalate are rolled with the substances indicated below for 25 minutes at 160° C. and processed and tested as in Example 1.

There are added:

(a) 0.3 part by weight of 4-cyclohexyl-phenyl-thiophosphoric acid-dihydrazide
(b) 0.6 part by weight of 4-cyclohexyl-phenyl-thiophosphoric acid-dihydrazide
(c) Without addition

Table 7

| Specimen | Color after 25 mins. at 160° C. | Color of the rolled sheet after heating to 170° C. for— | | | | |
|---|---|---|---|---|---|---|
| | | 15 min. | 30 min. | 60 min. | 90 min. | 120 min. |
| (a) | cl | cl | cl | sys | sbr | br |
| (b) | cl | cl | cl | acl | sbr | br |
| (c) | cl | cl | sbr | dbr | | |

EXAMPLE 8

100 parts by weight of polychlorobutadiene (Defo value 500–1000) are masticated with 4 parts by weight of zinc oxide and 4 parts by weight of magnesium oxide for 7 minutes on a mixing roll stand. 22.0 parts by weight of this rolled sheet are homogenized with 8.8 parts by weight of a terpene-phenol resin in 69.2 parts by weight of a solvent mixture consisting of 2 parts by weight of ethyl acetate, 2 parts by weight of benzene (B.P. 65–95° C.) and 1 part by weight of toluene and provided with 2 parts by weight (related to polychlorobutadiene) of stabilizer. A thin film is prepared from the solution and this film is tested in an oxygen bomb at 21 atm. and 70° C. according to Bierer-Davis.

Whereas an unstabilized specimen has become dark brown, brittle and fragile after being kept for 24 hours, a specimen with 4-cyclohexyl-phenyl-thiophosphoric acid dihydrazide has a light brown color after 38 days and still does not show any appreciable decrease in the strength properties.

EXAMPLE 9

100 parts by weight of a polyvinyl chloride/polyvinyl acetate copolymer with the K-value 50 and containing 13% of vinyl acetate are rolled for 10 minutes at 1 part by weight of 4-(cyclohexyl)-phenyl-thiophosphoric acid dihydrazide on a mixing roll stand heated at 120° C.

Specimens of the sheet rolled for 10 minutes are stored in a circulating hot air drier at a temperature of 170° C.

When compared with a specimen which has not been stabilized, and which already assumed a brownish color after being rolled for 10 minutes, the stabilized specimen only showed a brown coloring after being kept in the hot air drier for 30 minutes.

EXAMPLE 10

100 parts by weight of a polyvinyl chloride/polyvinyl acetate copolymer with the K-value 68 and containing 3% of vinyl acetate are rolled for 10 minutes on a mixing roll stand at a temperature of 160° C. with 1 part by weight of p-tert.-butyl phenyl thiophosphoric acid dihydrazide.

Specimens of the sheet rolled for 10 minutes are stirred in a circulating hot air drier at a temperature of 170° C.

Whereas the unstabilized specimen shows a dark brown coloring after being stored for 15 minutes in the said drier, the stabilized specimen is still colorless after the same period of time.

EXAMPLE 11

100 parts by weight of a polyblend of polyvinyl chloride with an emulsion base and chlorinated polyethylene of the K-value 80 are processed with 1 part by weight of 4-(cyclohexyl)-phenyl thiophosphoric acid dihydrazide and stored, as described in Example 9.

Whereas the unstabilized specimen shows a dark brown coloring after being stored for 15 minutes in the drier, the color of the stabilized specimen is still light brown after being stored for 90 minutes.

EXAMPLE 12

100 parts by weight of a polyblend of polyvinyl chloride on a suspension basis and chlorinated polyethylene of the K-value 80 are processed with 1 part by weight 4-(cyclohexyl)-phenyl thiophosphoric acid dihydrazide and stored, as described in Example 9.

Whereas the unstabilized specimen shows a brown color after being stored for 15 minutes in the hot air drier, the color of the stabilized specimen is unchanged after the same period of time.

We claim:

1. Chlorine-containing polymers selected from the group consisting of chlorinated rubber, sulfochlorinated polyethylene, homopolymers of vinyl chloride, vinylidene chloride and 2-chlorobutadiene, vinyl chloride-vinyl acetate copolymers, vinylidene chloride-vinyl acetate copolymers, and 2-chlorobutadiene-vinyl acetate copolymers, said polymers containing a stabilizing amount of a member selected from the group consisting of phosphoric and thiophosphoric acid hydrazides of the general formulae:

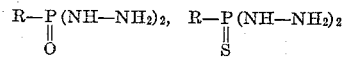

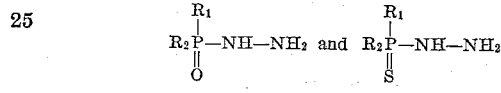

in which R, $R_1$ and $R_2$ are bonded by way of a member selected from the group consisting of O, N and C atoms to the phosphorus atom and are selected from the group consisting of phenyl, naphthyl, diphenyl, and cyclohexyl radicals which may be substituted by a member selected from the group consisting of chlorine, bromine, alkyl containing up to 12 carbon atoms, and cycloalkyl radicals.

2. The composition of claim 1 wherein the stabilizer is 4-(cyclohexyl)-phenyl-thiophosphoric acid dihydrazide.

3. The composition of claim 1 wherein the stabilizer is p-tert.-butyl-phenyl-thiophosphoric acid dihydrazide.

4. The composition of claim 1 wherein the stabilizer is (β-naphthyl)-thiophosphoric acid dihydrazide.

References Cited in the file of this patent

UNITED STATES PATENTS 2,906,770    Debo    Sept. 29, 1959

OTHER REFERENCES

Kosolapoff: "Organo-phosphorus Compounds," John Wiley & Sons, Inc., London, 1950, page 306.